(12) United States Patent
Tsai et al.

(10) Patent No.: US 10,784,042 B2
(45) Date of Patent: Sep. 22, 2020

(54) INDUCTION TYPE POWER SUPPLY SYSTEM AND COIL MODULE THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 0 days.

(21) Appl. No.: 16/294,858

(22) Filed: Mar. 6, 2019

(65) Prior Publication Data

US 2019/0206616 A1 Jul. 4, 2019

Related U.S. Application Data

(60) Division of application No. 15/979,406, filed on May 14, 2018, now Pat. No. 10,643,787, which is a continuation-in-part of application No. 14/835,677, filed on Aug. 25, 2015, now Pat. No. 10,002,707.

(30) Foreign Application Priority Data

Feb. 11, 2015 (TW) .............................. 104104594 A
Mar. 12, 2018 (TW) .............................. 107108244 A (51) Int. Cl.
*H01F 5/00* (2006.01)
*H01F 38/14* (2006.01)
*H01F 27/29* (2006.01)
*H02J 50/10* (2016.01)
*H01F 27/28* (2006.01)
*H02J 7/00* (2006.01)

(52) U.S. Cl.
CPC .......... *H01F 38/14* (2013.01); *H01F 27/2823* (2013.01); *H01F 27/2871* (2013.01); *H01F 27/29* (2013.01); *H02J 7/0042* (2013.01); *H02J 50/10* (2016.02); *H01F 2038/143* (2013.01)

(58) Field of Classification Search
USPC .................................................. 336/220, 200
See application file for complete search history.

(56) References Cited

U.S. PATENT DOCUMENTS

| | | | |
|---|---|---|---|
| 6,927,662 B2 * | 8/2005 | Kahlmann | H01L 27/08 257/E27.046 |
| 7,382,222 B1 * | 6/2008 | Manetakis | H01F 17/0006 336/200 |
| 9,496,732 B2 | 11/2016 | Partovi | |
| 2002/0036561 A1 | 3/2002 | Jedlitschka | |
| 2008/0297295 A1 * | 12/2008 | Yamazaki | H01F 5/003 336/90 |
| 2018/0025826 A1 | 1/2018 | Nishimura | |

* cited by examiner

*Primary Examiner* — Ronald Hinson
(74) *Attorney, Agent, or Firm* — Winston Hsu (57) ABSTRACT

A coil module for an induction type power supply system includes a supporting frame, an upper lid and a first wire. The upper lid, disposed on the supporting frame, includes a spiral slot. The first wire is used for being inserted in the spiral slot to form a coil.

5 Claims, 7 Drawing Sheets

INDUCTION TYPE POWER SUPPLY SYSTEM AND COIL MODULE THEREOF

CROSS REFERENCE TO RELATED APPLICATIONS

This application is a divisional application of U.S. application Ser. No. 15/979,406, filed on May 14, 2018. U.S. application Ser. No. 15/979,406 is further a continuation-in-part application of U.S. application Ser. No. 14/835,677, filed on Aug. 25, 2015. The contents of these applications are incorporated herein by reference.

BACKGROUND OF THE INVENTION

1. Field of the Invention

The present invention relates to an induction type power supply system and a related coil module, and more particularly, to an induction type power supply system and a related coil module having favorable electromagnetic induction performance.

2. Description of the Prior Art

Figure 1A:
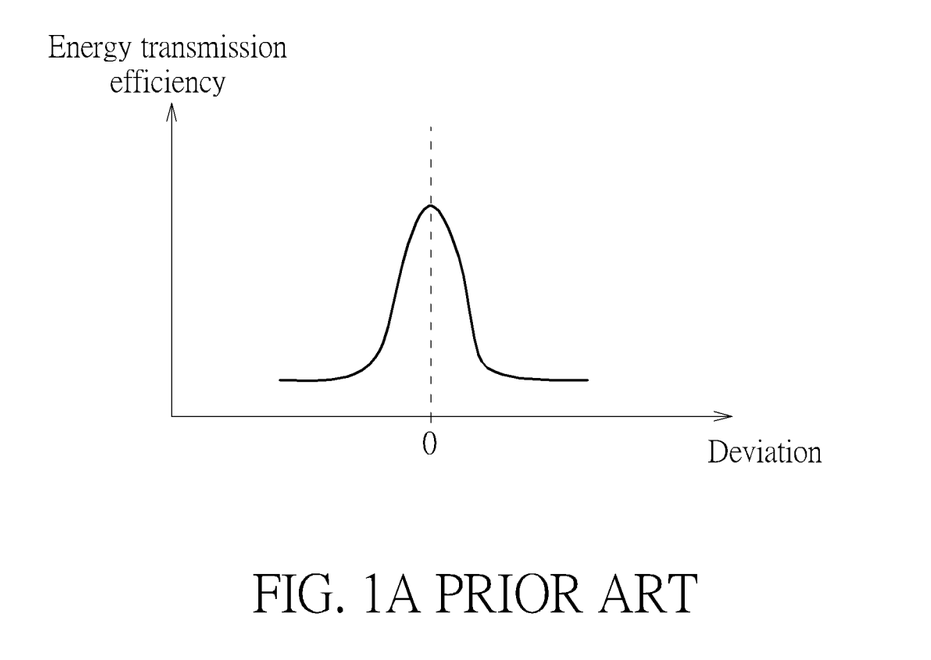
FIG. 1A is a schematic diagram of the relation between the energy transmission efficiency and the deviation of positions of conventional coils.

Conventionally, the coils of an induction type power supply system are wound with wires and then glued to form a flat spiral, as the winding methods of coils disclosed in US 2015/0364244 A1. With the conventional winding methods of coils, the energy transmissions are more concentrated. When the induction surface of the supplying-end coil is exactly aligned to the induction surface of the receiving-end coil, the energy transmission efficiency becomes extremely high. However, if a small position deviation appears between the supplying-end coil and the receiving-end coil, the energy transmission efficiency falls rapidly. The relation between the energy transmission efficiency and the deviation of positions is shown in FIG. 1A.

In recent years, the induction type power supply systems have been widely applied to a wireless charger of an automatic guided vehicle. Due to the deviation on the moving path of the automatic guided vehicle, the location of the automatic guided vehicle staying in the charging station may not be consistent. As a result, with the same magnitude of energies delivered by the power supply terminal, the power receiving device on the automatic guided vehicle may receive different magnitudes of power based on its stay location. Also, the deviation of the receiving-end coil relative to the supplying-end coil may significantly affect the magnitude of power received by the receiving-end coil.

In addition, if the supplying-end coil is not exactly aligned to the receiving-end coil during the power supply procedure, parts of energies delivered by the supplying-end coil may not be successfully transmitted to the power receiving terminal, but may be transmitted to the air or transmitted to devices behind the receiving-end coil, which causes an electromagnetic interference (EMI) problem. Thus, there is a need to provide a novel coil structure to improve the problem of deviation significantly reducing the power supply efficiency and the problem of excessive EMI.

SUMMARY OF THE INVENTION

It is therefore an objective of the present invention to provide an induction type power supply system and a related coil module, where the coil is formed by disposing a wire in a spiral slot, and the supplying-end coil and the receiving-end coil may use different and staggered winding patterns, to prevent large variations of energy transmission efficiency between the situations of coil alignment and deviation.

An embodiment of the present invention discloses a coil module for an induction type power supply system. The coil module comprises a supporting frame, an upper lid and a first wire. The upper lid, disposed on the supporting frame, comprises a spiral slot. The first wire is used for being inserted in the spiral slot to form a coil.

These and other objectives of the present invention will no doubt become obvious to those of ordinary skill in the art after reading the following detailed description of the preferred embodiment that is illustrated in the various figures and drawings.

DETAILED DESCRIPTION

Figure 1B:
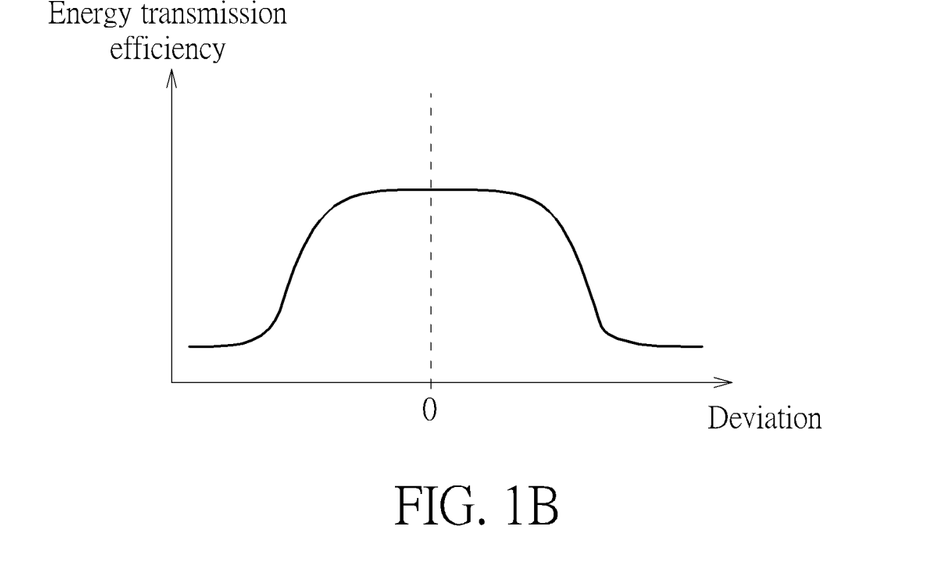
FIG. 1B is a schematic diagram of the relation between the energy transmission efficiency and the deviation of coil positions according to an embodiment of the present invention.

As mentioned above, for a conventional coil module, the energy transmission efficiency significantly falls when a deviation appears between the coils. In order to realize wireless charging applications for the automatic guided vehicle, the present invention provides a novel coil structure, which may realize the relation between the energy transmission efficiency and the deviation of coil positions as shown in FIG. 1B. As a result, the deviation of coil positions may not generate excessively large variations on the transmission efficiency of energies. In addition, as long as the receiving-end coil module of the automatic guided vehicle approaches the supplying-end coil module of the charging station, favorable power supply efficiency is achieved even if the two modules are not exactly aligned to each other.

Figure 2:
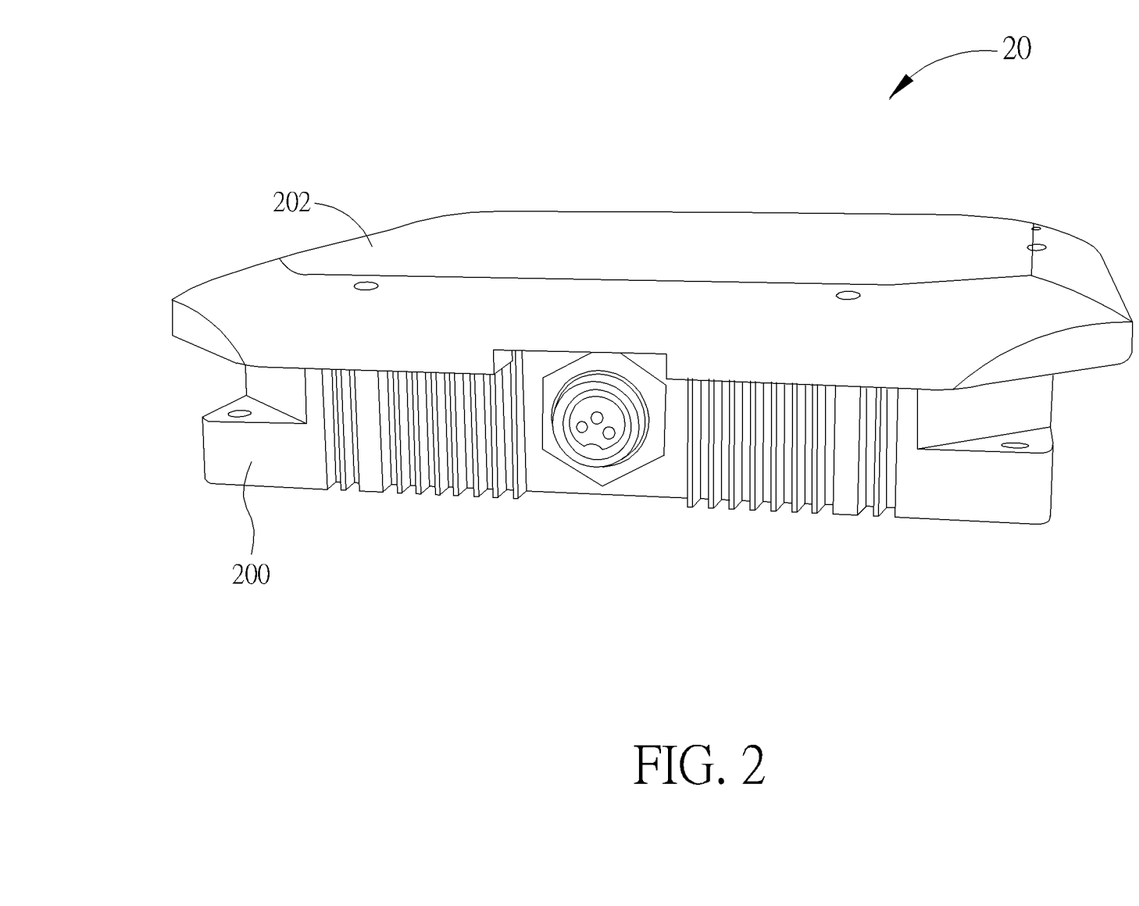
FIG. 2 is a schematic diagram of a coil module according to an embodiment of the present invention.

Please refer to FIG. 2, which is a schematic diagram of a coil module 20 according to an embodiment of the present invention. As shown in FIG. 2, the coil module 20 includes a supporting frame 200 and an upper lid 202. The supporting frame 200, which may be composed of metal (e.g., aluminum), is served as the main frame structure of the coil module 20, for supporting every element of the coil module 20. The supporting frame 200 is equipped with functions of heat dissipation and waterproof, etc., and the supporting frame 200 should also be solid and made by a collision-endurable material that can bear the percussion force of the automatic guided vehicle. The upper lid 202 may be disposed on the supporting frame 200, for covering the elements on the supporting frame 200 and providing waterproof functions.

Figure 3:
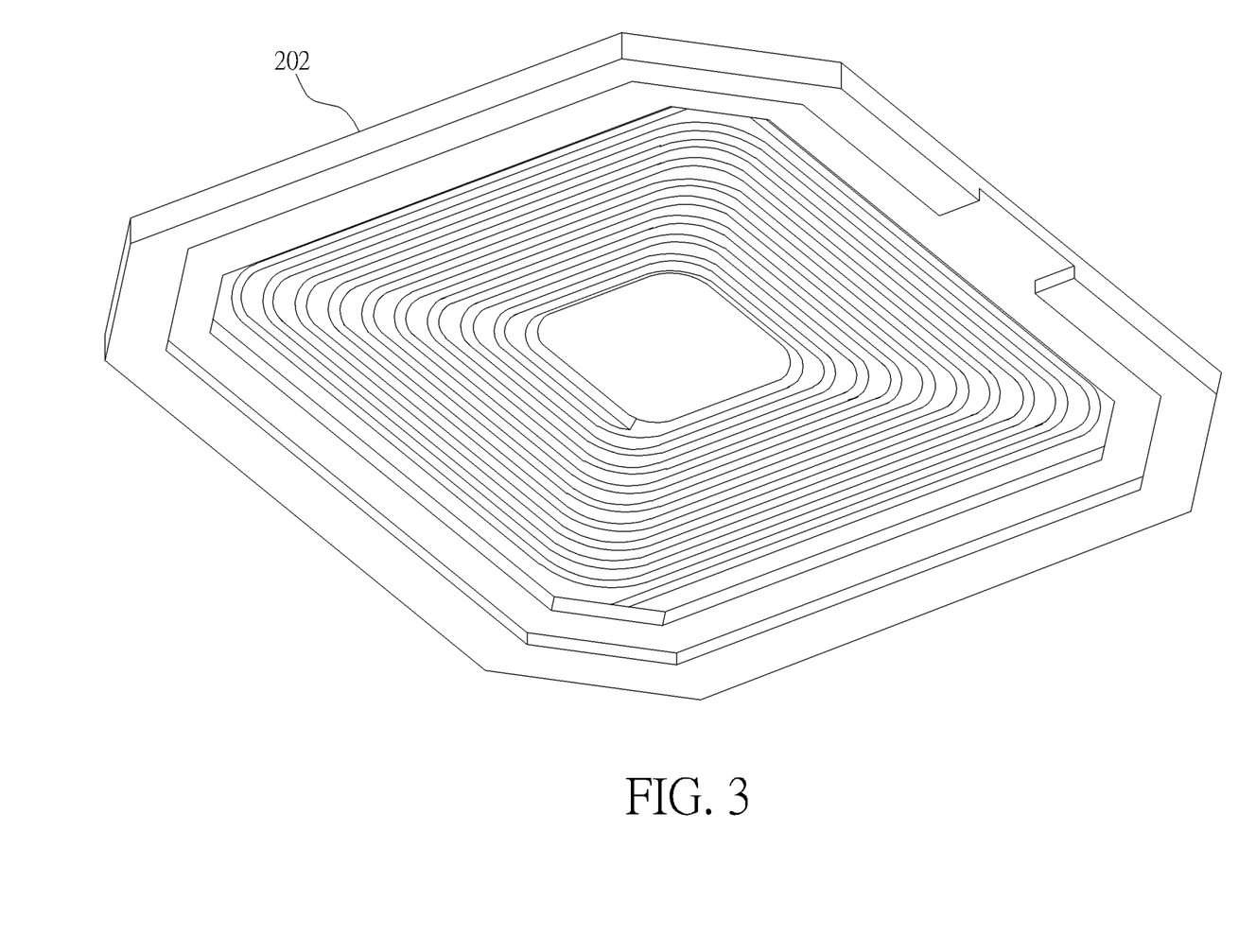
FIG. 3 illustrates an implementation of the upper lid shown in FIG. 2.

Please refer to FIG. 3, which illustrates an implementation of the upper lid 202 shown in FIG. 2. In detail, the upper lid 202 includes a spiral slot for disposing a wire. The coil module 20 may further include a wire, which may be inserted in the spiral slot to form the coil. In addition, in order to prevent the energies of the coil from being transmitted to the metal of the supporting frame 200 to generate heat, the coil module 20 may further include a magnetic conductor (not illustrated) disposed between the upper lid 202 and the supporting frame 200 (i.e., between the coil and the supporting frame 200), for isolating the electromagnetic energies of the coil. In addition, the magnetic conductor 104, which has heat conduction capability, may conduct the heat energies generated in the coil when the current passes through the coil, where the heat energies are transmitted to the metal frame 100 for heat dissipation. The magnetic conductor 104 may be composed of a magnetic material with high magnetic permeability. The magnetic material may be a Mn—Zn core, a Ni—Zn core, an iron powder core, a molypermalloy powder (MPP) core, a sendust core, a ferrite core, a high flux core or other equivalent magnetic material.

Please note that the spiral slot may be disposed with a shape following the shape of the upper lid, in order to achieve efficient usage of areas. Taking the embodiment shown in FIG. 3 as an example, the shape of the upper lid 202 is a square with filleted corners; hence, the shape of the slot is a square spiral where four corners of the square are modified to be rounded, allowing the coil to turn easily. Since the shapes of the upper lid 202 and the spiral slot are both approximate to a square, the disposition of the slot is able to efficiently utilize the area of the upper lid 202. In other words, the slot may spread over usable parts of the upper lid 202. In another embodiment, a spiral slot having another shape may be applied. For example, if the upper lid is circular, a circular spiral slot may be disposed on the upper lid; if the upper lid is triangular, a triangular spiral slot may be disposed on the upper lid, where the three corners of the triangle may also be modified to be rounded allowing the coil to turn easily. By this method, the present invention may efficiently utilize the area of the upper lid. In comparison, the conventional coil is formed by gluing and thus must be circular. The space of the upper lid may not be efficiently utilized if the upper lid is not circular.

Figure 4:
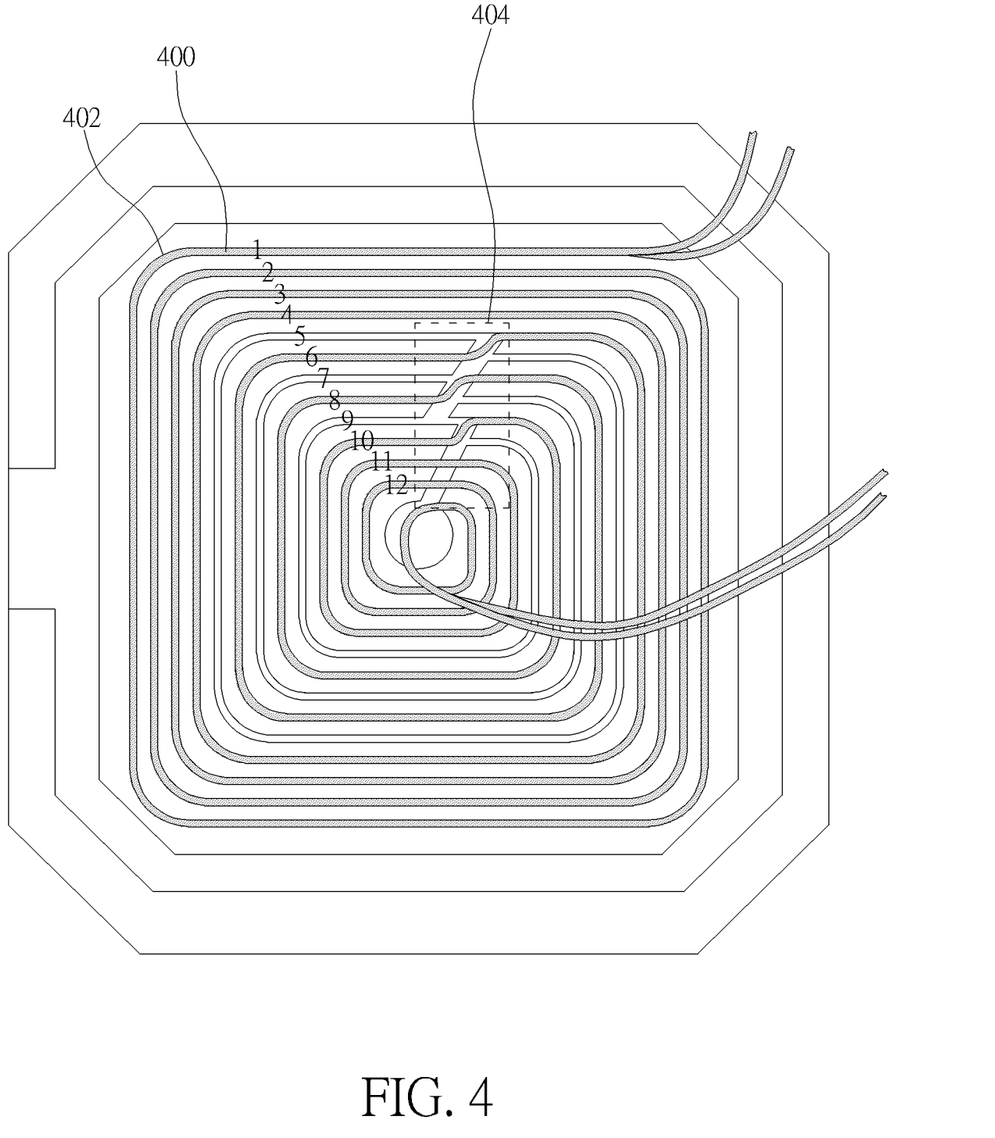
FIG. 4 is a schematic diagram of a coil disposed in the spiral slot according to an embodiment of the present invention.
Figure 5:
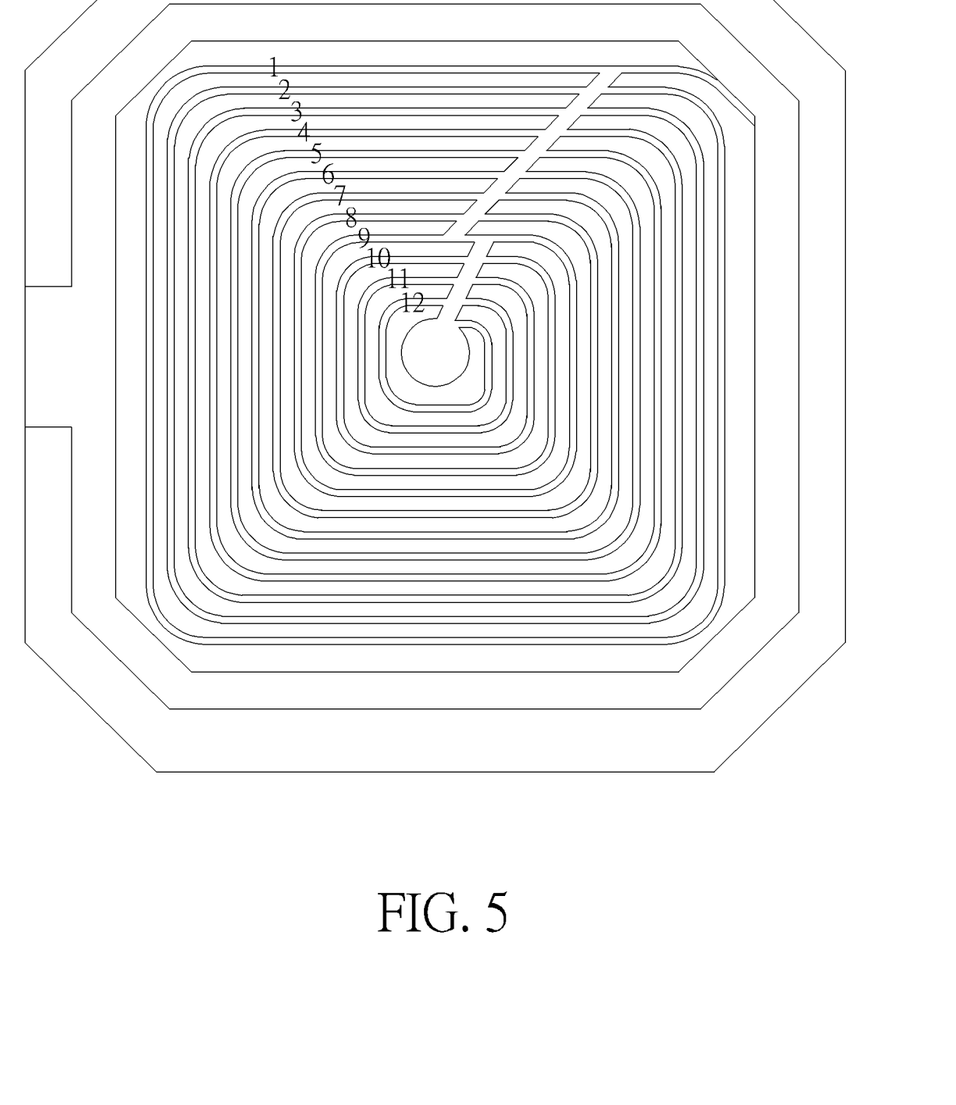
FIG. 5 is a schematic diagram of a spiral slot according to an embodiment of the present invention.

In addition, there are many different methods of inserting the wire in the spiral slot. In an embodiment, an opening is disposed between two adjacent layers of the spiral slot. Please refer to FIG. 4, which is a schematic diagram of a coil 400 disposed in a spiral slot 402 according to an embodiment of the present invention. Suppose that the outmost layer of the spiral slot 402 is the $1^{st}$ layer, and the layer numbers are shown in FIG. 4. At the position upper to the center of the spiral slot 402, openings 404 are disposed between the $5^{th}$ layer and the $6^{th}$ layer, between the $6^{th}$ layer and the $7^{th}$ layer, and so on, until the innermost layer. Each opening 404 connects two adjacent layers to form a channel capable of passing the wire. As shown in FIG. 4, the coil 400 is disposed as follows: the wire is disposed along the path of the slot from the $1^{st}$ layer (the outmost layer), until the opening 404 connecting the $5^{th}$ layer with the $6^{th}$ layer, and the wire then enters the $6^{th}$ layer via the opening 404 without entirely filling the $5^{th}$ layer. Then, at the opening 404 connecting the $7^{th}$ layer with the $8^{th}$ layer, the wire directly enters the $8^{th}$ layer via the opening 404 without entirely filling the $7^{th}$ layer; at the opening 404 connecting the $9^{th}$ layer with the $10^{th}$ layer, the wire directly enters the $10^{th}$ layer via the opening 404 without entirely filling the $9^{th}$ layer. Note that the above wire disposition is an outside-in implementation, and the wire disposition of the present invention is not limited herein. For example, an inside-out implementation may also be feasible. In an embodiment, the wire may entirely fill the $5^{th}$ layer of the spiral slot 402 and then pass through the opening 404 to enter the $7^{th}$ layer from the $6^{th}$ layer. Alternatively, the wire may cross more than two layers via the opening 404, e.g., entering the $7^{th}$ layer from the $5^{th}$ layer via the opening 404, or entering the $9^{th}$ layer from the $6^{th}$ layer via the opening 404. In an embodiment, the wire may not pass through any opening, and may be wound along every layer of the spiral slot 402 to form the coil. In addition, other openings may be disposed from the $1^{st}$ layer to the 5th layer of the spiral slot, to enhance the flexibility of wire disposition, as shown in FIG. 5.

On the other hand, the number of wires inserted in the slot is not a limitation of the present invention. For example, as shown in FIG. 4, the coil 400 is formed by two insulated wires inserted in the spiral slot 402. Preferably, the capability of transmitting modulation signals may be included in one of the wires, and the other wire is only used for power transmission without performing signal modulation and/or demodulation operations. In other words, a signal modulation circuit or signal demodulation circuit is only connected with one of the two wires, so that the modulation signals are transmitted via one wire only, which reduces the influence of signal modulation/demodulation operations on the performance or power transmission. In another embodiment, there may be more than two wires inserted in the spiral slot 402 to form the coil, and the signal modulation/demodulation operations are performed in only one of the wires. In a further embodiment, the characteristics of the wire used for signal modulation/demodulation operations may be adjusted. For example, a thinner wire or a wire having fewer cores may be applied to perform the signal modulation/demodulation, in order to minimize the influence of signal modulation/demodulation operations on the performance of power transmission. In addition, the signal modulation circuit or signal demodulation circuit may be connected to only one terminal of the coil (such as the terminal drawn from the innermost layer), allowing the modulation signals to be concentrated in the inner circles of the coil, which further enhances the capabilities of signal transmission and interpretation.

As mentioned above, the coil of the conventional induction type power supply system is wound and glued to form a flat spiral, and its energy transmission efficiency may significantly fall with deviations of coil positions. In addition, if the supplying-end coil is not exactly aligned to the receiving-end coil during power supply procedure, the electromagnetic interference (EMI) problem occurs easily. In comparison, the coil of the present invention is formed by inserting wire(s) in the spiral slot located in the upper lid, and the disposition of wire (s) in the slot may solve the above problems. In detail, in the present invention, the methods of disposing a spiral slot having openings in the upper lid and inserting wire(s) in the spiral slot to form the coil are applicable to both the power supply terminal (i.e., the supplying-end coil) and the power receiving terminal (i.e., the receiving-end coil). Based on different applications, the pattern of the wire inserted in the spiral slot for the supplying-end coil may be identical to or different from the pattern of the wire inserted in the spiral slot for the receiving-end coil.

Figure 6A:
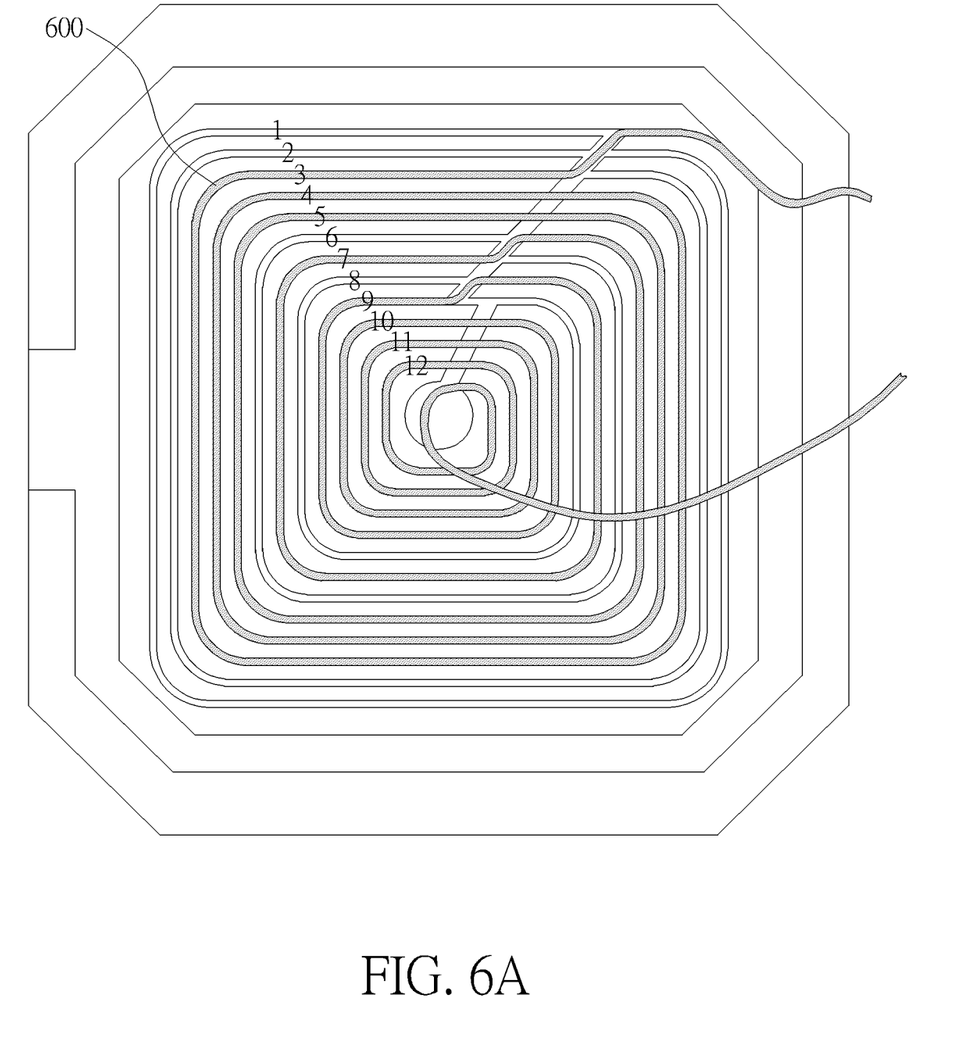
FIGS. 6A and 6B are schematic diagrams of a supplying-end coil and a receiving-end coil according to an embodiment of the present invention.
Figure 6B:
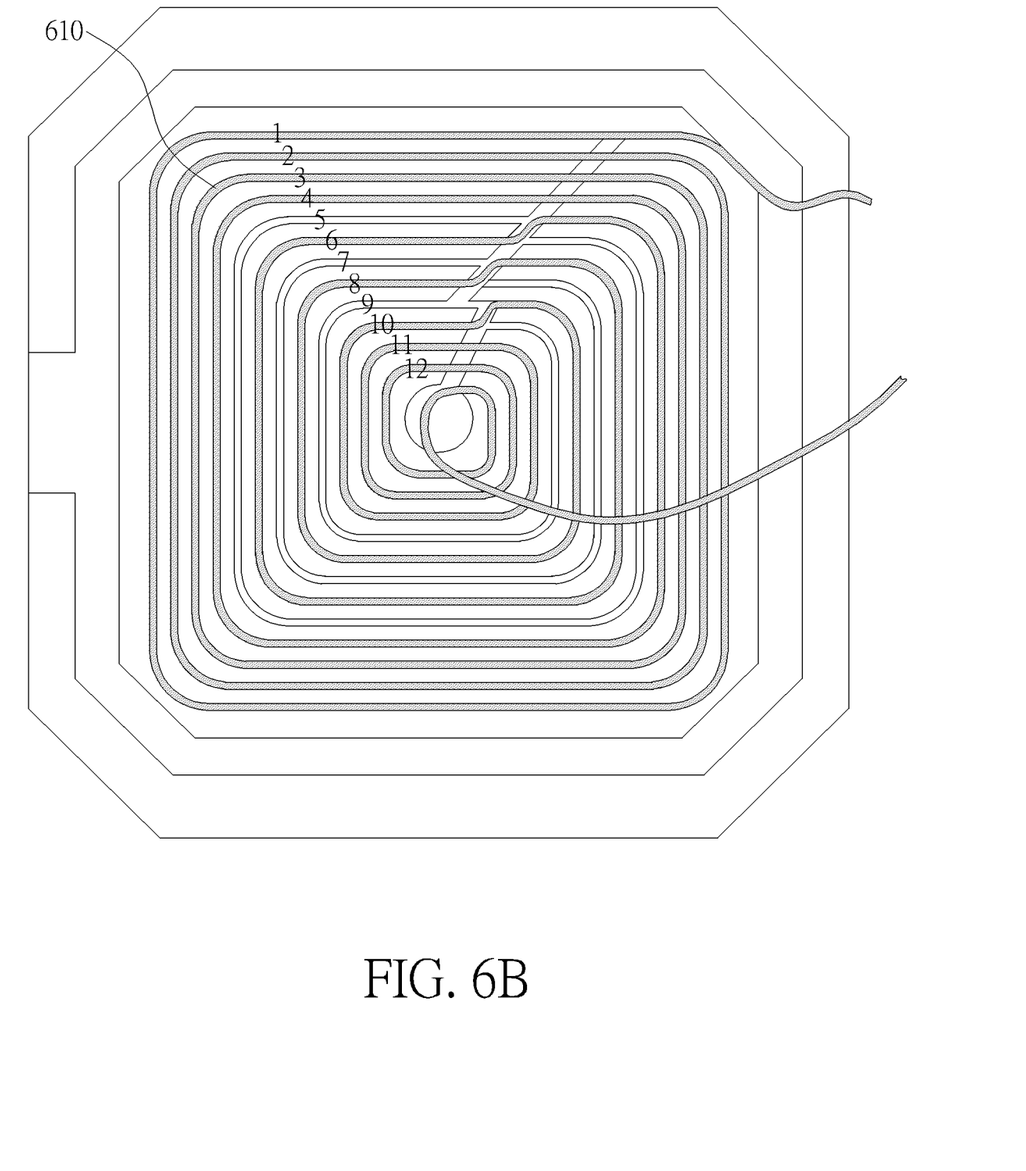

In an embodiment, the length of the outmost circle of the supplying-end coil may be designed to be smaller than the length of the outmost circle of the receiving-end coil. Please refer to FIGS. 6A and 6B, which are schematic diagrams of a supplying-end coil 600 and a receiving-end coil 610, respectively, according to an embodiment of the present invention. Similarly, suppose that the outmost layer of the spiral slot is the $1^{st}$ layer and the innermost layer of the spiral slot is the $12^{th}$ layer, and the layer numbers are shown in FIGS. 6A and 6B. As shown in FIG. 6A, in the spiral slot of the supplying-end coil 600, the outmost layer having a wire is the $3^{rd}$ layer. As shown in FIG. 6B, in the spiral slot of the receiving-end coil 610, the outmost layer having a wire is the $1^{st}$ layer. In such a condition, the length of the outmost circle of the supplying-end coil 600 (as the $3^{rd}$ layer of the spiral slot) is smaller than the length of the outmost circle of the receiving-end coil 610 (as the $1^{st}$ layer of the spiral slot). As such, the entire area of the receiving-end coil 610 is greater than the entire area of the supplying-end coil 600. When a deviation of coil positions appears, the energies delivered by the supplying-end coil 600 may not exceed the receivable range of the receiving-end coil 610 as long as the position deviation does not cause the supplying-end coil 600 to go beyond the area of the receiving-end coil 610. Therefore, the EMI may be reduced.

Please note that the above method of controlling the entire area of the supplying-end coil to be smaller than the entire area of the receiving-end coil may cause that the number of circles in the receiving-end coil becomes greater than the number of circles in the supplying-end coil. Due to the principle of a transformer, the ratio of the output voltage to the input voltage is equal to the ratio of the coil number in the output terminal to the coil number in the input terminal. Therefore, if the number of circles in the receiving-end coil is greater than the number of circles in the supplying-end coil much excessively, the voltage received by the power receiving terminal may become too high; this increases the difficulty of controlling the voltage. Ideally, if the number of circles in the receiving-end coil is equal to the number of circles in the supplying-end coil, the output voltage of the power receiving terminal is easily controlled to be substantially equal to the input voltage of the power supply terminal. Alternatively, the number of circles in the receiving-end coil may be designed to be close to the number of circles in the supplying-end coil, so that the magnitude of the output voltage may be easily controlled. In such a condition, the number of circles in the spiral slot entirely filled with the wire of the supplying-end coil 600 may be controlled to be equal or close to the number of circles in the spiral slot entirely filled with the wire of the receiving-end coil 610, in order to effectively control the output voltage. Taking the coils shown in FIGS. 6A and 6B as an example, the disposition method of the supplying-end coil 600 and the receiving-end coil 610 may be represented in Table 1 as shown below:

TABLE 1

| Layer number of the spiral slot | Supplying-end coil 600 | Receiving-end coil 610 |
|---|---|---|
| 1 | | 1 |
| 2 | | 2 |
| 3 | 1 | 3 |
| 4 | 2 | 4 |
| 5 | 3 | |
| 6 | | 5 |
| 7 | 4 | |

TABLE 1-continued

| Layer number of the spiral slot | Supplying-end coil 600 | Receiving-end coil 610 |
|---|---|---|
| 8 | | 6 |
| 9 | 5 | |
| 10 | 6 | 7 |
| 11 | 7 | 8 |
| 12 | 8 | 9 |

Please refer to Table 1 together with FIGS. 6A and 6B. The supplying-end coil 600 passes through the openings of the spiral slot in the $6^{th}$ layer and the $8^{th}$ layer, respectively, and the outmost circle of the supplying-end coil 600 is in the $3^{rd}$ layer of the spiral slot; hence, the supplying-end coil 600 totally includes 8 circles of wire. The receiving-end coil 610 passes through the openings of the spiral slot in the $5^{th}$ layer, the $7^{th}$ layer and the $9^{th}$ layer, respectively; hence, the receiving-end coil 610 totally includes 9 circles of wire. In such a condition, the number of circles in the supplying-end coil 600 is close to the number of circles in the receiving-end coil 610, allowing the output voltage at the power receiving terminal to be effectively controlled.

In addition, the supplying-end coil 600 and the receiving-end coil 610 pass through the openings at different positions, so that the positions of the wire inserted in the slot of the supplying-end coil 600 are partially staggered with the positions of the wire inserted in the slot of the receiving-end coil 610. In such a condition, even if the supplying-end coil 600 and the receiving-end coil 610 are entirely aligned, the wires of these two coils may not be entirely overlapped, which prevents the problem where the energy transmission efficiency becomes excessively large when the coils are aligned to each other. As a result, the energy transmission efficiency may be identical within a specific range of coil deviation, which generates an ideal situation as shown in FIG. 1B. Therefore, the drawback in the prior art where the energy transmission efficiency significantly decreases due to coil deviations may be improved.

In general, the energy distribution on the coil is that the two terminals of the wire have the highest energy while the middle part of the coil has the lowest energy. In the conventional method of winding the coil, the wire is glued to form the coil, and therefore the density of wire should be identical between the two terminals and the middle part. Enhancement of the output energy of the coil is only feasible by increasing the number of circles of the coil, which is accompanied by increasing parasitic resistance due to the increasing length of wire. In comparison, in the embodiments of the present invention, the coil is formed by inserting the wire in the spiral slot, where there is a gap between two adjacent wires. This structure may lead to smaller parasitic resistance under the same coil area (since the wire length may be shorter). In order to enhance the energy transmission efficiency, the wire may be designed to pass through more openings of the spiral slot in the middle part of the coil, allowing the density of wire in the middle part of the coil to be lower than the density of wire near the two terminals of the coil, as the implementation of coil shown in FIGS. 6A and 6B. As a result, the length of wire in the middle part with lower energy may be reduced, in order to reduce the parasitic resistance and also enhance the energy transmission efficiency.

Please note that the present invention provides an induction type power supply system and a related coil module where a slot is disposed in the upper lid and a wire is inserted in the slot to form the coil. Those skilled in the art may make modifications and alternations accordingly. For example, the spiral slot may be disposed in any manners according to system requirements, where the openings may be located in any positions for passing the wire. In addition, in the above embodiment, the density of wire in the middle part of the coil is reduced by controlling the wire to pass through more openings in the middle part of the coil; in another embodiment, the density of wire may also be adjusted based on the disposition of the spiral slot. For example, in the middle part of the coil, the slot is disposed to have a lower density (i.e., the distance between two adjacent layers is larger), and at the outsides of the coil, the slot is disposed to have a higher density (i.e., the distance between two adjacent layers is smaller). In addition, the induction type power supply system and the coil module of the present invention are adaptive to a wireless charging system of an automatic guided vehicle, to improve the problem that the power supply efficiency significantly falls due to position deviations of the automatic guided vehicle. However, the application of the automatic guided vehicle should not be a limitation of the present invention. In other words, the induction type power supply system and the coil module of the present invention may also be applicable to other type of wireless charging system, such as a desktop wireless charger for a mobile device or a charger for an electronic car.

To sum up, in the induction type power supply system and the coil module of the present invention, the disposition method of the coil is disposing a spiral slot in the upper lid and inserting a wire in the slot to form the coil. In comparison with the conventional coil formed by winding and gluing the wire, the disposition method of the coil of the present invention has higher flexibility and improves many problems in the prior art. In the coil of the present invention, an opening is disposed between two adjacent layers of the spiral slot. The wire may enter the next layer by passing through the opening, to reduce the wire length of the coil, in order to reduce parasitic resistance. In addition, the supplying-end coil and the receiving-end coil may have different patterns of wire disposition. In an embodiment, the length of the outmost circle in the supplying-end coil is smaller than the length of the outmost circle in the receiving-end coil, so that the entire area of the receiving-end coil is greater than the entire area of the supplying-end coil; hence, when a deviation of coil position appears, the energies delivered by the supplying-end coil may not exceed the receivable range of the receiving-end coil, in order to reduce EMI. In an embodiment, the number of circles in the receiving-end coil may be controlled to be equal or close to the number of circles in the supplying-end coil, to effectively control the output voltage at the power receiving terminal. In an embodiment, the supplying-end coil and the receiving-end coil pass through the openings at different positions in the spiral slot, so that the positions of the wire inserted in the slot in the supplying-end coil are partially staggered with the positions of the wire inserted in the slot in the receiving-end coil, in order to prevent the energy transmission efficiency from becoming excessively large when the coils are aligned to each other. Therefore, the drawback where the energy transmission efficiency significantly decreases due to coil deviations may be improved. In addition, the wire may be designed to pass through more openings in the middle part of the coil, allowing the density of wire in the middle part of the coil to be lower than the density of wire near the two terminals of the coil, in order to reduce the parasitic resistance and also enhance the whole energy transmission efficiency. As a result, with the spiral slot and appropriate disposition of wire according to the present invention, the performance of the induction type power supply system and the coil module may be enhanced significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A coil module for an induction type power supply system comprising:
    a supporting frame;
    an upper lid, disposed on the supporting frame, the upper lid comprising a spiral slot, wherein the spiral slot has a plurality of layers; and
    a first wire, for being inserted in the spiral slot to form a coil;
    wherein an opening is disposed between the $N^{th}$ layer and the $(N+1)^{th}$ layer among the plurality of layers of the spiral slot, and N is a positive integer.

2. The coil module of claim 1, wherein the first wire is disposed by entering the $(N+1)^{th}$ layer from the $N^{th}$ layer via the opening without entirely filling the $N^{th}$ layer.

3. The coil module of claim 1, wherein a shape of the spiral slot is disposed following a shape of the upper lid.

4. The coil module of claim 1, wherein the first wire and a second wire insulated from the first wire are disposed in the spiral slot, and operations of signal modulation or demodulation are performed on one of the first wire and the second wire, while the other wire transmits power without performing the operations of signal modulation or demodulation.

5. The coil module of claim 1, wherein the density of wire in a middle part of the coil is lower than the density of wire near two terminals of the coil.

* * * * *